United States Patent
Ziegler et al.

(10) Patent No.: US 8,981,604 B2
(45) Date of Patent: Mar. 17, 2015

(54) ACTIVE ELEMENT FOR AN ELECTROMAGNETIC MACHINES, A METHOD OF FABRICATING SUCH AN ACTIVE ELEMENT, AND AN ELECTROMAGNETIC MACHINE INCLUDING SUCH AN ACTIVE ELEMENT

(75) Inventors: Nicolas Ziegler, Montpeillier (FR); Daniel Matt, Castelnau (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 1745 days.

(21) Appl. No.: 12/373,437

(22) PCT Filed: Jun. 28, 2007

(86) PCT No.: PCT/FR2007/001088
§ 371 (c)(1),
(2), (4) Date: Mar. 8, 2011

(87) PCT Pub. No.: WO2008/006953
PCT Pub. Date: Jan. 17, 2008

(65) Prior Publication Data
US 2011/0169350 A1 Jul. 14, 2011

(30) Foreign Application Priority Data
Jul. 12, 2006 (FR) ...................... 06 06335

(51) Int. Cl.
| | |
|---|---|
| *H02K 25/00* | (2006.01) |
| *H02K 23/04* | (2006.01) |
| *H02K 41/03* | (2006.01) |
| *H02K 15/03* | (2006.01) |
| *H02K 1/27* | (2006.01) |
| *H02K 7/08* | (2006.01) |

(52) U.S. Cl.
CPC .............. *H02K 41/031* (2013.01); *H02K 15/03* (2013.01); *H02K 41/033* (2013.01); *H02K 1/278* (2013.01); *H02K 7/08* (2013.01)
USPC .............. 310/46; 310/44; 310/43; 310/12.24; 310/12.26

(58) Field of Classification Search
CPC ....... H02K 25/00; H02K 23/04; H02K 41/03; H02K 41/031
See application file for complete search history.

(56) References Cited

U.S. PATENT DOCUMENTS

| 4,857,786 A | * | 8/1989 | Nihei et al. .............. 310/156.38 |
| 2002/0114824 A1 | * | 8/2002 | Fukui et al. .................... 424/432 |
| 2005/0008978 A1 | * | 1/2005 | Dams et al. .................... 430/322 |
| 2006/0163951 A1 | * | 7/2006 | Ben Ahmed et al. ........... 310/12 |

FOREIGN PATENT DOCUMENTS

| EP | 1 237 058 | 9/2002 |
| FR | 2 194 068 | 2/1974 |
| FR | 2 588 133 | 3/1987 |
| JP | 2004 119927 | 4/2004 |

OTHER PUBLICATIONS

Machine Translation of FR2588133, Roux et al., Apr. 1987.*

* cited by examiner

*Primary Examiner* — Terrance Kenerly
(74) *Attorney, Agent, or Firm* — Sughrue Mion, PLLC

(57) ABSTRACT

The invention provides an active element for an electromagnetic machine, the element comprising an alternating succession in a main direction of portions presenting a first magnetic property and of portions presenting a second magnetic property, wherein the element includes a non-magnetic covering that is thin relative to a thickness of the portions and that extends to cover a substantial fraction of an outside surface of the active element, the covering being secured to at least some of the portions and presenting sufficient strength to form a member for mechanically transmitting the magnetic forces to which the portions are subjected.

2 Claims, 3 Drawing Sheets

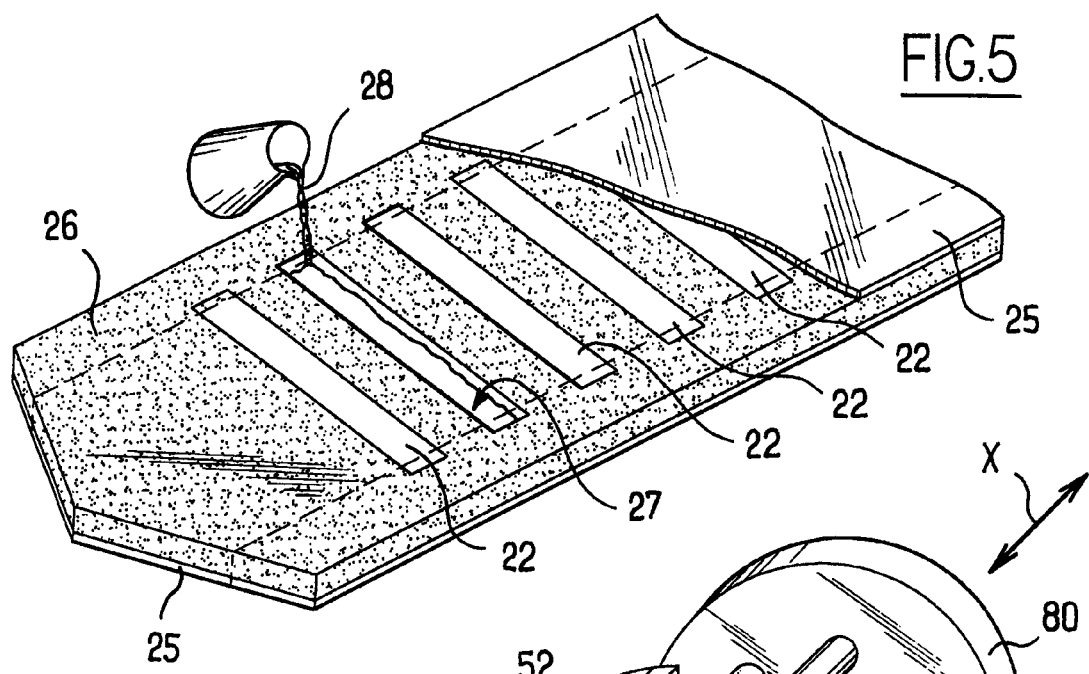
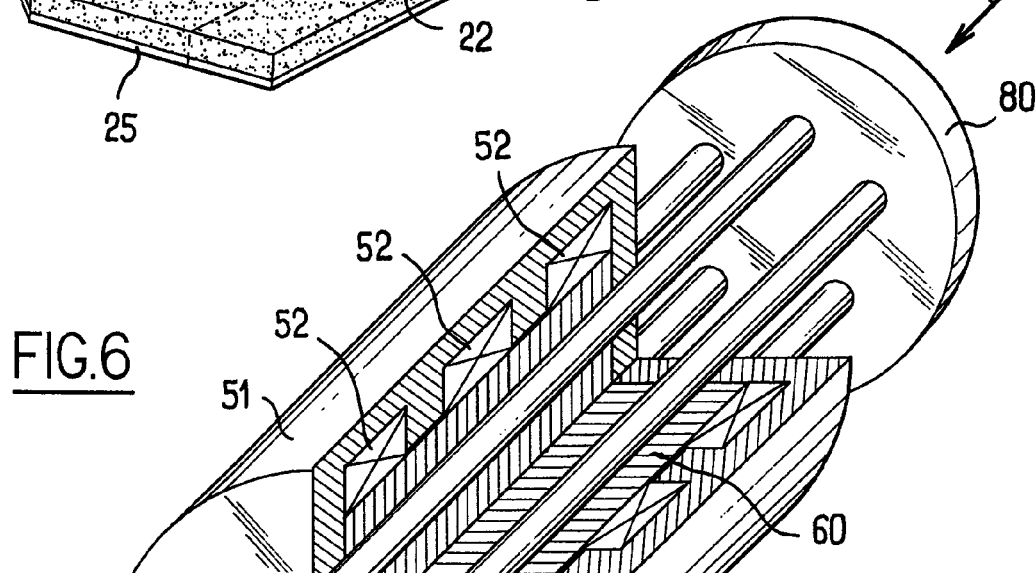
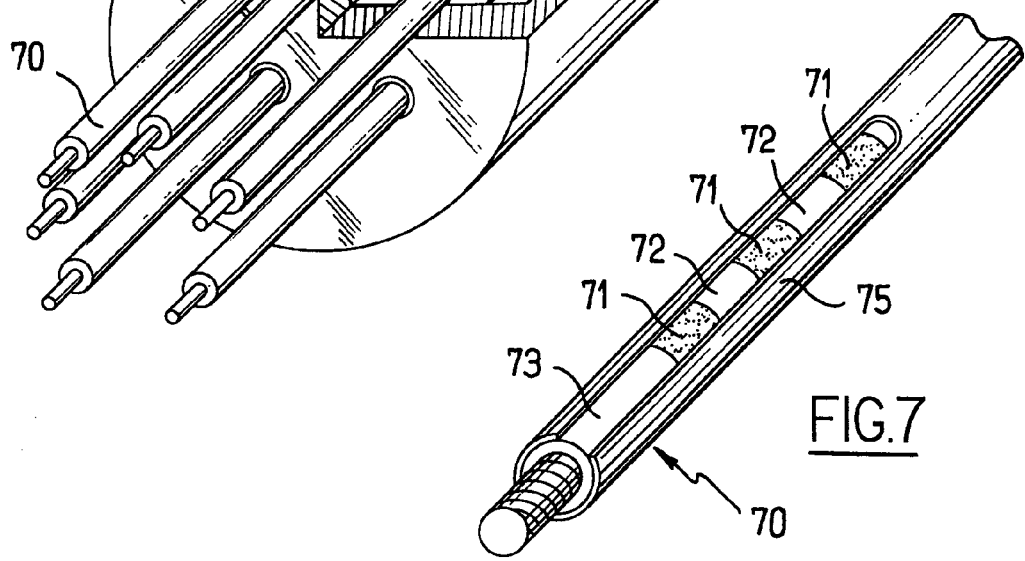

US 8,981,604 B2

ACTIVE ELEMENT FOR AN ELECTROMAGNETIC MACHINES, A METHOD OF FABRICATING SUCH AN ACTIVE ELEMENT, AND AN ELECTROMAGNETIC MACHINE INCLUDING SUCH AN ACTIVE ELEMENT

CROSS-REFERENCE TO RELATED APPLICATIONS

This application is entitled to the benefit of and incorporates by reference essential subject matter disclosed in International Application No. PCT/FR2007/001088 filed on Jun. 28, 2007 and French Patent Application No. 06 06335 filed on Jul. 12, 2006.

FIELD OF THE INVENTION

The invention relates to an active element for an electromagnetic machine, to a method of fabricating such an active element, and to a machine including such an active element.

BACKGROUND OF THE INVENTION

Linear electromagnetic machines are known that have two parts that move relative to each other in a sliding direction. At least one of the parts extending in the sliding direction includes active elements, each made up of a succession of portions having different magnetic properties.

In variable-reluctance machines, the portions of each active element alternate between ferromagnetic portions and non-magnetic portions. In permanent-magnet machines, the active elements of one of the parts comprise portions that alternate between ferromagnetic portion and non-magnetic portions, while the active elements of the other part comprise magnetized portions that alternate between portions magnetized in a first direction and portions magnetized in a second direction opposite to the first.

The two parts are placed to interact electromagnetically, one of the parts being associated with means for generating a magnetic field. Magnetic-field generation causes magnetic forces to appear that tend to move the parts relative to each other in the sliding direction. Alternatively, the machine may be operated as a generator by imparting a relative movement between the two parts.

In a first type of electromagnetic machine, the portions making up the active elements are in the form of plates or blades. The active elements of the two parts are parallel and form respective interleaved combs such that an active element of one of the parts extends between two active elements of the other part (naturally with the exception of the outermost active elements).

In an embodiment shown in FIG. 5 of document FR 2 588 133, the portions forming the active elements of the movable part are subdivided into two sub-portions extending on either side of a central support that holds the sub-portions at one end thereof and that takes up the magnetic forces to which the portions are subjected. The portions forming the active elements of the stationary part are likewise subdivided into two sub-portions, each being held via one of its ends by an external support.

Those supports are complex to fabricate and they receive each of the sub-portions via one end only, which means that the sub-portions are cantilevered out and that they are therefore subjected to stresses that tend to separate them from the supports that receives them. In addition, the end of each sub-portion that is engaged in a support is not in magnetic interaction with the sub-portions of the facing active elements, and those ends therefore do not participate in the operation of the machine. In addition, the presence of central supports and of external supports increases the overall size of the machine. The supports do not participate in the magnetic interaction between the active elements, so they take up precious space and tend to limit the volume power density of the machine.

In a second type of electromagnetic machine, as illustrated in the article "Actionneur linéaire synchrone machine à aimants permanents multi-tiges" [Synchronous linear actuators with multiple-rod permanent magnets], presented to the colloquium "Electrotechnique du futur, SUPELEC, Dec. 9-10, 2003", the active elements of the movable part are in the form of rods and comprise cylindrical portions threaded onto a central support. The central support holds the portions and mechanically takes up the magnetic forces to which the portions are subjected, and it stiffens the rod.

As with plates, the central support does not contribute to the magnetic interactions and it occupies precious space, tending to limit the volume power density of the machine.

As suggested in document FR 2 588 133, it is possible to omit the support and to bond the portions of a given active element to one another by adhesive or by brazing. Nevertheless, that method assumes that the portions are mutually adjacent and that they are suitable for being bonded together by brazing or adhesive. The magnetic forces are then transmitted mechanically in traction through the bonds made in this way, which is not ideal from a mechanical point of view.

OBJECT OF THE INVENTION

An object of the invention is to provide a novel active element that provides greater efficiency.

BRIEF SUMMARY OF THE INVENTION

In order to achieve this object, the invention provides an active element for an electromagnetic machine, the element comprising an alternating succession in a main direction of portions presenting a first magnetic property and of portions presenting a second magnetic property. According to the invention, the active element includes a non-magnetic covering that is thin relative to a thickness of the portions and that extends to cover a substantial fraction of an outside surface of the active element, the covering being secured to at least some of the portions and presenting sufficient strength to form a member for mechanically transmitting the magnetic forces to which the portions are subjected.

Thus, the covering is placed on the outside of the active element, i.e. in a zone of greatest second moment of area, such that the covering contributes greatly to stiffening the active element in spite of being thin. The electromagnetic interactions then take place through the covering.

The magnetic forces acting on the portions are transmitted mechanically in shear by the covering, and that is highly favorable from a mechanical point of view. The covering thus forms an effective force transmitter that is very compact.

Thus, in the context of an active element in the form of a plate or a blade, it is advantageous to provide a covering that has two thin walls substantially covering the two large faces of the active element through which the electromagnetic interactions take place. In the context of an active element in the form of a rod, it is advantageous to provide a covering that comprises a tubular thin wall that covers the cylindrical portions.

BRIEF DESCRIPTION OF THE DRAWINGS

The invention can be better understood in the light of the following description with reference to the figures of the accompanying drawings, in which:

FIG. 5 is a view of the FIG. 3 active element shown during fabrication in a variant embodiment;

FIG. 6 is a perspective view of an electromagnetic machine of the invention including active elements in the form of rods; and FIG. 7 is a partially cutaway detail view of an active element segment of the machine shown in FIG. 5.

DETAILED DESCRIPTION OF THE INVENTION

Figure 1:
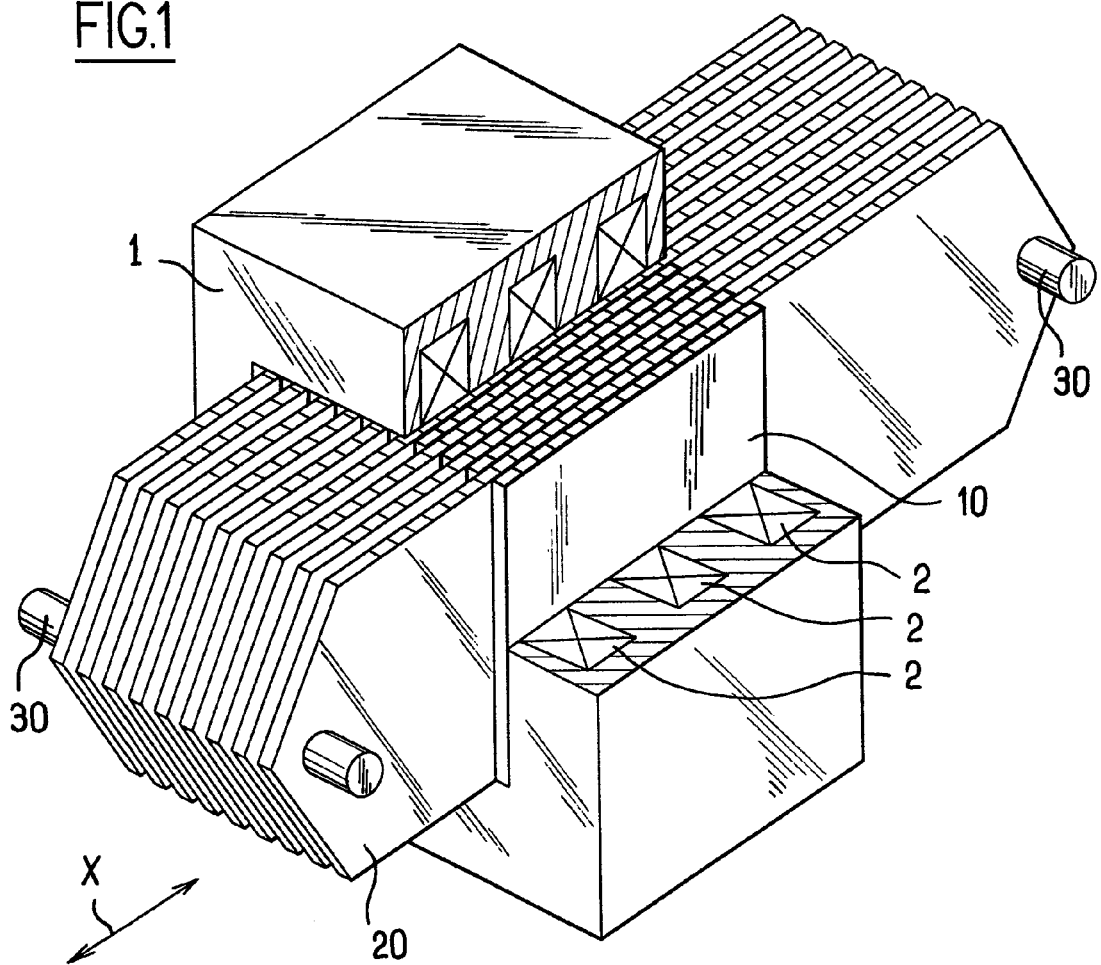
FIG. 1 is a perspective view of an electromagnetic machine of the invention including active elements in the form of plates.

The invention is initially described with reference to a linear electromagnetic machine with multiple air gaps, such as the machine shown in FIG. 1. In known manner, such a machine comprises a cage 1 of ferromagnetic material, here receiving three coils 2 electrically powered so as to be offset successively by 120°. The magnetic field generated by the coils 2 is transmitted in an active zone of the cage 1 in which there extend in alternation:

active elements in the form of stationary plates 10 that are mutually parallel and prevented from moving relative to the cage (only one stationary plate is referenced). Each of the stationary plates 10 comprises a succession of permanent magnets, as described in greater detail with reference to FIG. 2;

active elements in the form of mutually parallel movable plates 20, each extending between two stationary plates 10 so as to present a plurality of air gaps relative thereto (only one movable plate 20 is referenced). Each of the movable plates 20 comprises a succession of ferromagnetic portions and of non-magnetic portions, as described in greater detail below with reference to FIGS. 3 to 5. The movable plates 20 are secured to one another by means of pins 30 extending to pass through all of the movable plates 20. The movable plates slide in a sliding direction X facing the stationary plates 10.

Figure 2:
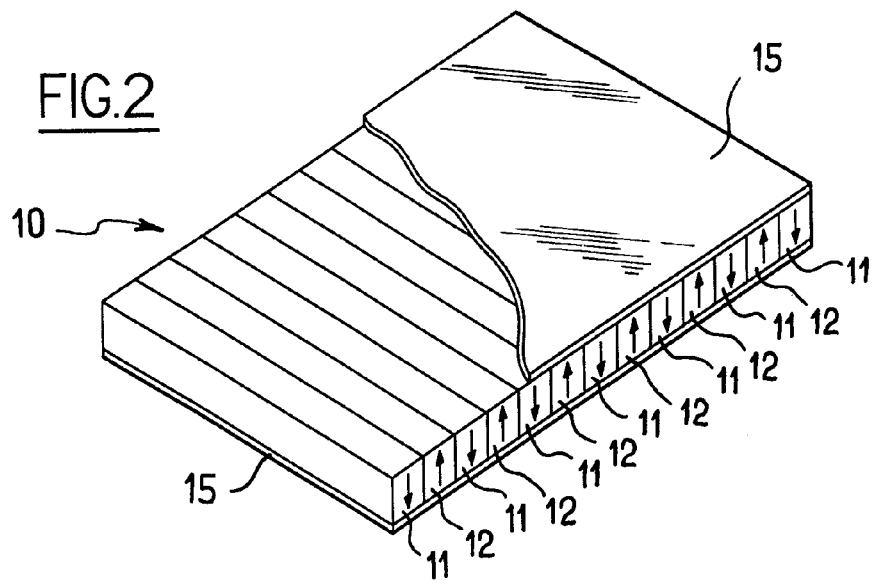
FIG. 2 is a cutaway detail view of an active element of the machine shown in FIG. 1.

As shown in FIG. 2, each stationary plate 10 comprises permanent magnets 11 oriented in a first direction disposed in alternation with permanent magnets 12 oriented in a second direction opposite to the first, as represented by the arrows drawn on the ends of the permanent magnets. The permanent magnets 11 and 12 are mutually touching bars and they form successive portions having alternating magnetic properties. According to an essential aspect of the invention, each stationary plate 10 has thin non-magnetic walls 15 that extend on either side of the stationary plate 10 over the large faces thereof and that are secured to the permanent magnets 11 and 12, e.g. by adhesive. The large surfaces are made up of the adjacent side walls of the bars.

By way of example, the permanent magnets 11 and 12 present a thickness of about 1 millimeter (mm), while the thin walls 15 present a thickness of 0.1 mm. The thin wall 15 is made of bronze.

The thin walls 15 form support means for the permanent magnets 11 and 12 that are very compact. The full height of the permanent magnets 11 and 12 can thus interact electromagnetically with the movable plates 20 facing them through the thin walls 15 so that all of the magnets are used for producing mechanical forces on the movable plates 20.

In addition, the thin walls 15 form the outer layers of a sandwich structure having its core constituted by the permanent magnets 11 and 12, thereby giving the stationary plate 10 a high degree of stiffness in bending.

Figure 3:
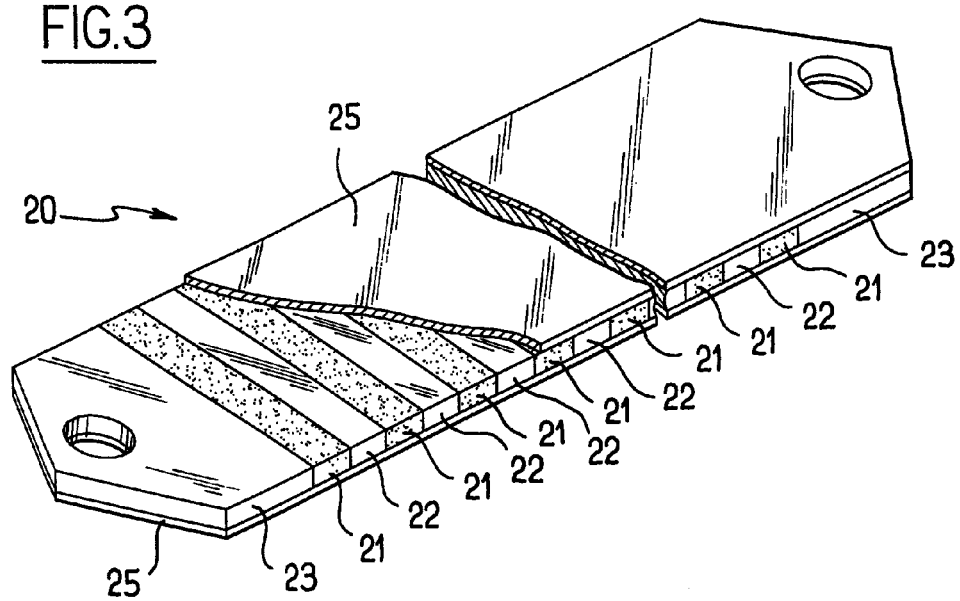
FIG. 3 is a cutaway detail view of another active element of the machine shown in FIG. 2.

As shown in FIG. 3, each movable plate 20 comprises ferromagnetic portions 21 disposed in alternation with non-magnetic portions 22. The portions 21 and 22 form touching bars. Each movable plate 20 also has non-magnetic ends 23 extending the portions 21 and 22 and serving to receive the pins 30 that secure the movable plates 21 to one another so as to form the movable element of the machine. According to an essential aspect of the invention, each movable plate 20 comprises thin walls 25 that extend on either side of the movable plate 20 over the large faces thereof, being secured to the portions 21 and 22 and also to the ends 23, e.g. by adhesive.

In addition to their above-mentioned stiffening function, the thin walls also serve to transmit mechanically to ends 23 the magnetic forces to which the portions 21 and 22 are subjected. The mechanical transmission of these forces between the thin walls 25 and the portions 21 and 22 takes place in shear, which is an effective mode of transmission for adhesively-bonded assemblies. Here likewise, the thin walls 25 are made of bronze.

Figure 4:
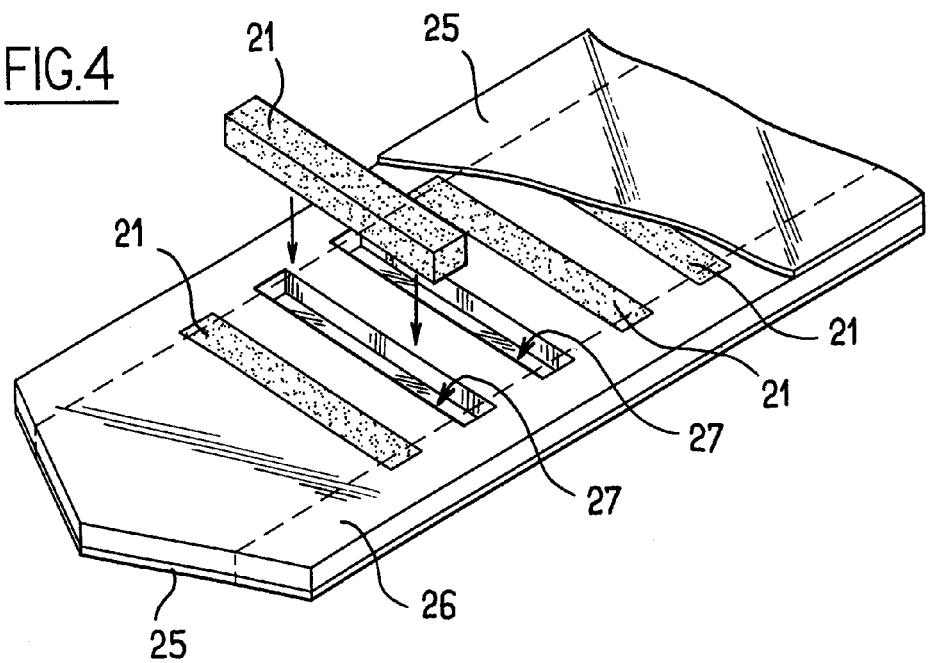
FIG. 4 is a view of the FIG. 3 active element shown during fabrication.

As shown in FIG. 4, and in a preferred embodiment, each movable plate 20 is obtained by using a sheet of non-magnetic material 26 having parallel windows 27 cut out therein for receiving the ferromagnetic portions 21. To make a movable plate 20, a thin wall 25 is adhesively bonded to one of the large faces of the cut-out sheet 26, here on the bottom large face. Then the ferromagnetic portions 21 are placed in the windows 27. One of the ferromagnetic portions 21 is shown while it is being put into place in one of the windows 27. Thereafter, the other thin wall 25 is adhesively bonded to the top large face of the cut-out sheet 26. The side margins of the cut-out sheet 26 are then cut away along the dashed lines so that the cut-out sheet 26 that remains between the ferromagnetic portions 21 constitutes the non-magnetic portions 22. It then remains to drill the ends 23 in order to provide the orifices for receiving the pins 30.

In the variant shown in FIG. 5, the cut-out sheet 26 is made of ferromagnetic material, while the windows are filled with liquid resin 28 in order to form the non-magnetic portions.

After the resin has set, the top thin wall 25 has been adhesively bonded, and the side margins have been cut away from the dashed lines, the cut-out sheet extending between the windows forms the ferromagnetic portions 21, while the resin 28 forms the non-magnetic portions 22.

The fabrication method shown in FIGS. 4 and 5 can naturally be applied to a stationary plate, or indeed a plate without an end. Similarly, it is possible to leave the windows empty, with the air therein forming the non-magnetic portions.

In known machines, it is desired to keep empty spaces between the facing plates so as to ensure they do not touch, since the facing portions are not covered and therefore risk sliding one against another and catching one another because of the multiple edges at the boundaries between the portions. Keeping such spaces empty requires the movable plates to be externally guided relative to the stationary plates and gives rise to magnetic instabilities that tend to move the plates towards one another, and thus to stress them in bending, thereby leading to variable air gaps. These empty spaces enlarge the air gaps between the plates considerably, and thus reduce the efficiency of the machine.

In contrast, and in accordance with a particularly advantageous aspect of the invention, the machine of FIG. 1 is designed so that in operation the stationary plates 10 and the movable plates 20 slide with very little clearance with contact between the plates being allowed. The accurate guidance provided in this way enables the air gaps between the magnetic portions of two facing plates to be kept substantially constant and equal at most to the thickness of the thin walls rubbing against one another plus the clearance for sliding. The plates come into contact via their thin walls 15 and 25 which are continuous and without edges, thereby facilitating sliding.

In addition, the accurate guidance provided in this way increases the stiffness, and thus the buckling strength, of the movable plates 20, so they can be long. The movable plates 20 can thus be floatingly mounted on the pins 30.

The material used for the thin walls 15 and 25 (bronze in this example) allows the plates to slide relative to one another with a coefficient of friction that is low. In a variant, the thin walls 15 and 25 could be made of some other non-magnetic material, and if the material does not possesses a favorable coefficient of friction, then the thin walls 15 and 25 can advantageously be coated in a surface layer having a low coefficient of friction, for example of polytetrafluoroethylene (PTFE), and compatible with the operating conditions of the machine, and in particular its internal temperature.

The invention is illustrated below with reference to a linear electromagnetic machine having rods as shown in FIG. 6.

This type of machine likewise comprises a cage 51 receiving three coils 52 that are phase-offset at 120° intervals. The magnetic field generated by the coils 52 is transmitted in an active zone of the cage 51 within which there extend:

a stationary core 60 made up of permanent magnets in the form of disks with alternating magnetizations; and mutually parallel movable rods 70 that extend through orifices in the stationary core 60 so as to present annular air gaps relative thereto (only one movable rod 70 is referenced). Each of the movable rods 70 comprises a succession of ferromagnetic portions and of non-magnetic portions, as described in greater detail below with reference to FIG. 7. The movable rods 70 are secured to one another by means of an end plate 80 to which the ends of the movable rods 70 are fastened. The rods slide in a sliding direction X.

The stationary core 60 performs the same function in this embodiment as the stationary plates 10, and the movable rods 70 perform the same function as the movable plates 20.

As can be seen in FIG. 7, each movable rod 70 has ferromagnetic portions 71 disposed in alternation with non-magnetic portions 72. Each movable rod 70 also has threaded non-magnetic end portions 73 that extend in line with the portions 71 and 72 and that are designed to be received in one of the end plates 80 that secure the movable plates 70 to one another so as to form the moving element of the machine. According to an essential aspect of the invention, each movable rod 70 has a thin tubular wall 75 (shown partially cut away to clarify the figure) that extends around the movable rod 70 and that is secured to the portions 71 and 72 and also to the ends 73, e.g. by adhesive. The electromagnetic interaction between the portions of the movable rods and the stationary core takes place through the tubular thin wall 75.

As with the plates, the tubular thin wall 75 holding the portions 71 and 72 greatly stiffens the movable rod 70 and serves to transmit the magnetic forces to which the portions 71 and 72 are subjected mechanically to the ends 73 (transmission taking place in shear as above).

Furthermore, the absence of a central support makes it possible for the portions 71 and 72 to be made solid, having no central orifice, thereby improving the efficiency of the machine.

According to a particularly advantageous aspect of the invention, the movable rods 70 are slidably received in the orifices of the stationary core 60 with small clearance, thus allowing the movable rods 70 to come into contact with the stationary core 60. As a result, the movable rods 70, which may be long, are well guided, thereby increasing their stiffness and their ability to withstand buckling. Furthermore, the air gap is well controlled and substantially equal at most to the thickness of the tubular thin wall 75 plus the clearance for sliding. The tubular thin wall 75 is made of bronze, a material that presents a low coefficient of friction. The tubular thin wall 75 rubs directly against the orifice in the stationary core. Nevertheless, the thin wall 75 is continuous and without edges, thereby encouraging sliding of the associated movable rod.

The invention is not limited to the above description, but on the contrary covers any variant coming within the ambit defined by the claims.

In particular, although the description above relates to machines in which some of the active elements have magnetic portions, the invention can naturally be applied to other types of machine, for example to variable reluctance machines without permanent magnets, the portions making up the active elements then alternating between being ferromagnetic and non-magnetic.

Although the portions of an active element are shown herein as being adjacent, empty spaces could be left between these portions. Furthermore, one portion could be constituted entirely by an empty space.

Although the active elements shown herein have an outer covering in the form of one or more continuous thin walls covering all of an outside face of the active element, the covering could have other forms. In particular, the covering need not comprise continuous walls but could comprise strips extending in the sliding direction of the active element along the surface thereof. It is then preferable for the strips of one active element to be arranged to face strips of the facing active elements. Under all circumstances, it is important for the covering to be sufficiently strong to be capable of mechanically transmitting the magnetic forces to which the portions of the active element are subjected.

Although it is stated that the covering is bonded to the portions adhesively, other connection methods could be used. For example, the covering could be obtained by coating the portions with a hot material that forms the covering on cooling. The covering may also be sprayed onto the portions in a gas.

Although it is stated that all of the portions are secured to the covering, it is possible for some of them not to be secured thereto, for example for every other portion not to be secured. The magnetic forces are then transmitted to the thin wall(s) solely by those portions that are secured thereto, still in shear.

Finally, although the invention is described with reference to linear electromagnetic machines, the invention can be applied to rotary machines, e.g. having active elements in the form of disks. Under such circumstances, the portions extending along angular sectors alternate in a main direction around a circle. The covering then comprises two thin walls extending over the two large spaces of the disk formed by the adjacent side faces of the portions.

What is claimed is:

1. A method of fabricating an active element comprising an alternating succession in a main direction (X) of portions presenting a first magnetic property and of portions presenting a second magnetic property, the element comprising a non-magnetic covering that is thin relative to a thickness of the portions and that extends to cover a substantial fraction of an outside surface of the active element, the covering being secured to at least some of the portions and presenting sufficient strength to form a member for mechanically transmitting the magnetic forces to which the portions are subjected, wherein the portions are bars so that the active element is substantially in the form of a plate presenting two opposite large faces formed by the adjacent side faces of the bars, the covering extending to cover a substantial fraction of the large faces, the method comprising the steps of:
    cutting parallel windows out in a sheet presenting a first magnetic property;
    fitting in the windows portions that present a second magnetic property;
    applying a covering to one of the two faces of the sheet so as to cover the portions substantially; and
    cutting away the side margins of the sheet so that the sheet lying between two windows itself forms portions of the active element.

2. A method of fabricating an active element comprising an alternating succession in a main direction (X) of portions presenting a first magnetic property and of portions presenting a second magnetic property, the element comprising a non-magnetic covering that is thin relative to a thickness of the portions and that extends to cover a substantial fraction of an outside surface of the active element, the covering being secured to at least some of the portions and presenting sufficient strength to form a member for mechanically transmitting the magnetic forces to which the portions are subjected, wherein the portions are bars so that the active element is substantially in the form of a plate presenting two opposite large faces formed by the adjacent side faces of the bars, the covering extending to cover a substantial fraction of the large faces, the method comprising the steps of:
    cutting parallel windows out in a sheet presenting a first magnetic property;
    leaving the windows empty;
    applying a covering to one of the two faces of the sheet so as to cover the portions substantially; and
    cutting away the side margins of the sheet so that the sheet lying between two windows itself forms portions of the active element.

* * * * *